United States Patent

[11] 3,580,136

[72] Inventor Albert G. Bodine
 7877 Woodley Ave., Van Nuys, Calif. 91406
[21] Appl. No. 782,347
[22] Filed Dec. 9, 1968
[45] Patented May 25, 1971

[54] SONIC ENERGY IN MACHINING OPERATIONS
 7 Claims, 12 Drawing Figs.
[52] U.S. Cl. ..................................... 90/64,
 90/11R, 90/11C, 90/14, 90/63, 29/Dig.46, 77/Dig.1
[51] Int. Cl. .................................... B23d 39/00,
 B23b 47/34, B23c 1/00
[50] Field of Search .......................... 51/59 (SS); 77/(CB); 29/(VIBR); 90/11, 11.3, 14, 15, 63, 64

[56] References Cited
UNITED STATES PATENTS

| | | | |
|---|---|---|---|
| 2,939,250 | 6/1960 | Kline | 29/(VIBR) |
| 3,015,914 | 1/1962 | Roney | 51/59-SS |
| 3,166,772 | 1/1965 | Bodine, Jr. | 51/59-SS |
| 2,921,372 | 1/1960 | Bodine, Jr. | 32/27 |

FOREIGN PATENTS

| | | | |
|---|---|---|---|
| 664,163 | 6/1963 | Canada | 77/CB |

Primary Examiner—Gil Weidenfeld
Attorney—Sokolski & Wohlgemuth

ABSTRACT: A machine tool such as a drill has a stem of elastic material to which the cutting tool is attached. Supported on this stem is an orbiting-mass oscillator. While a machining operation is being performed, the orbiting-mass oscillator is driven at a frequency such as to resonantly elastically vibrate the stem, thereby providing sonic energy to the cutting tool which effectively pulverizes the cuttings made by the cutting tool so that they will not impede the machining operation.

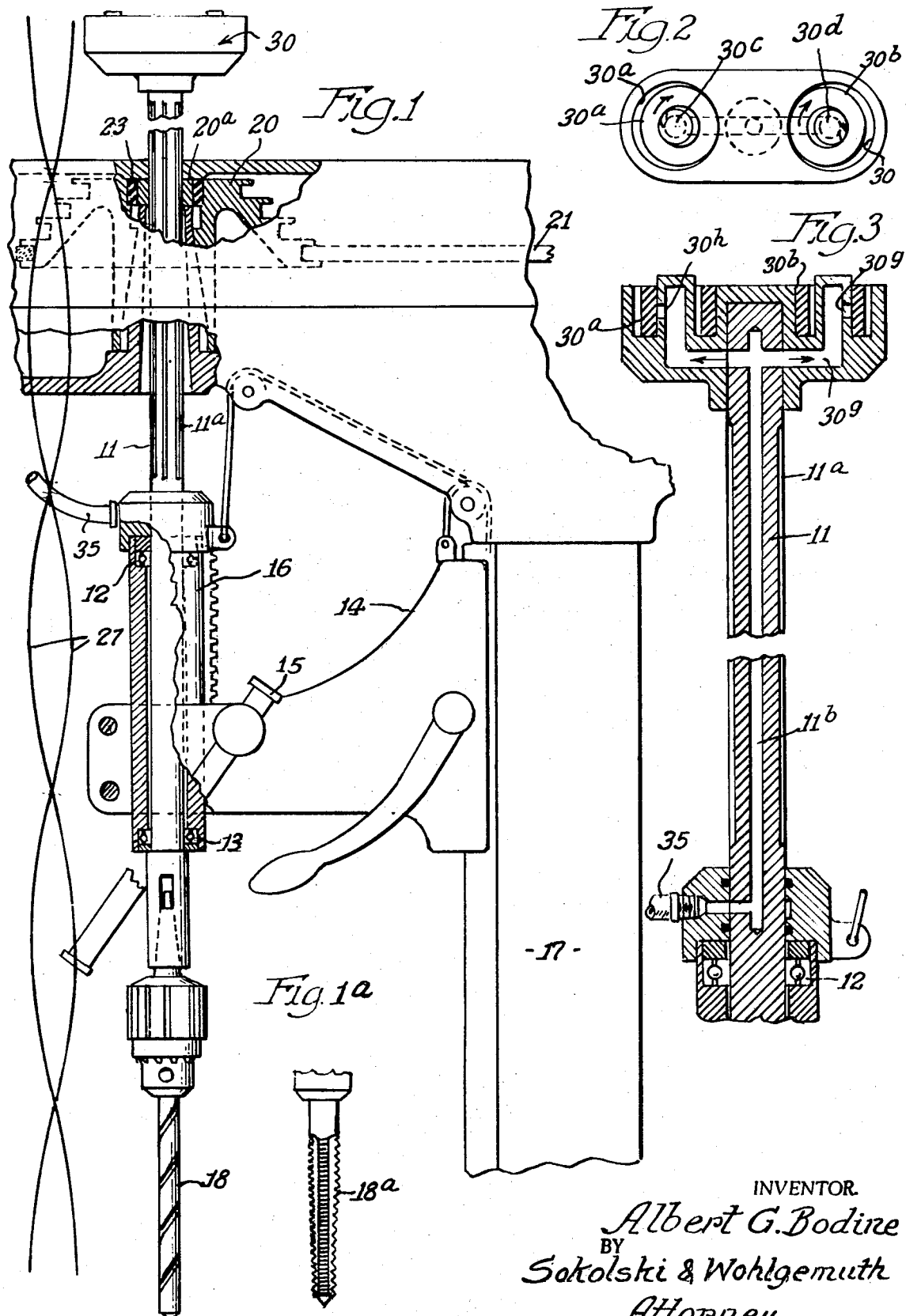

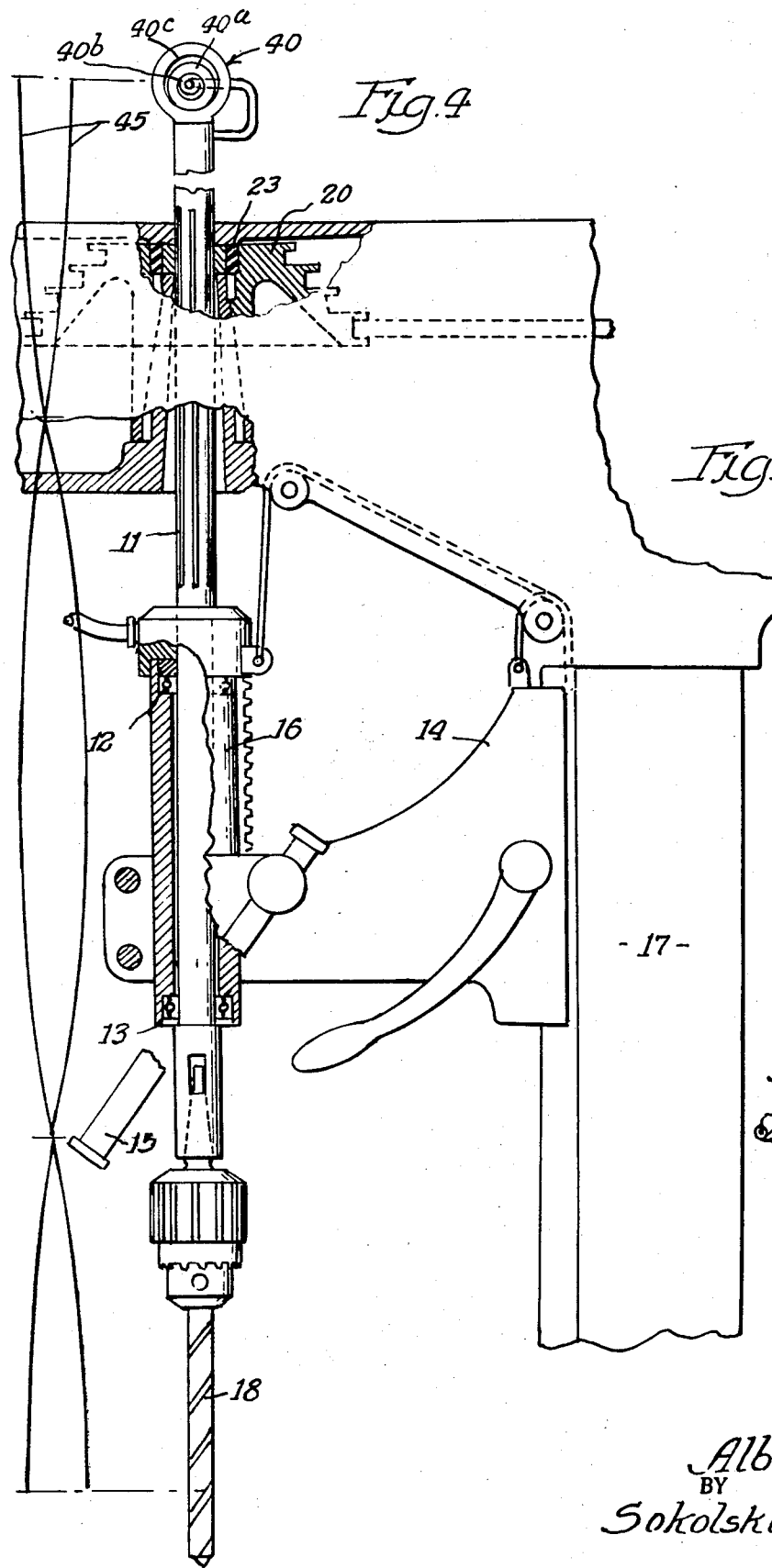
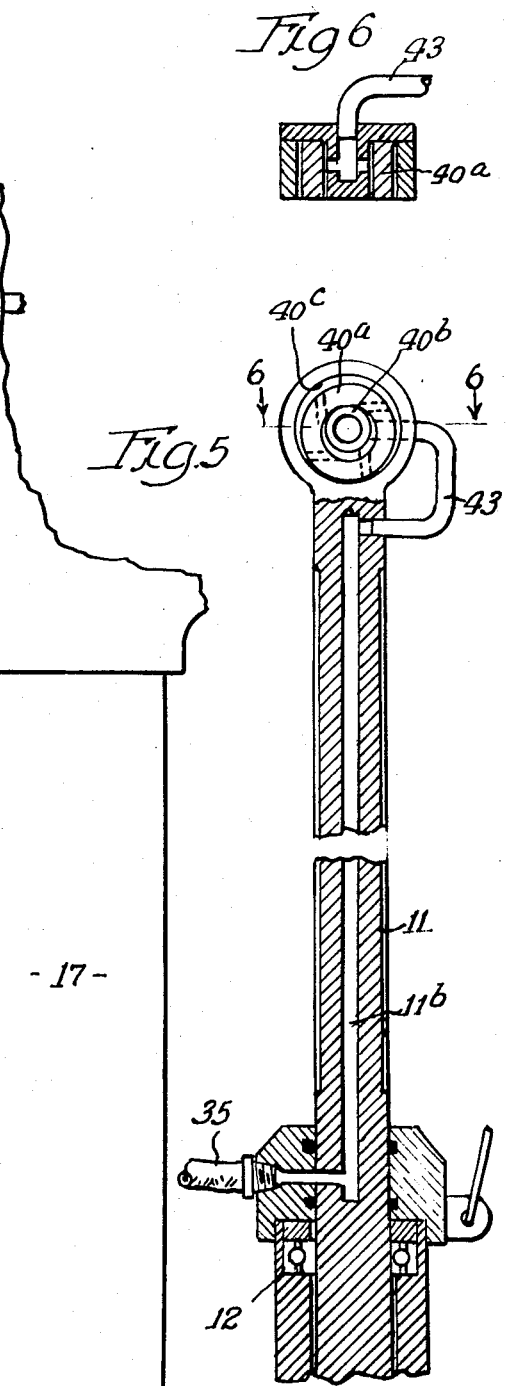

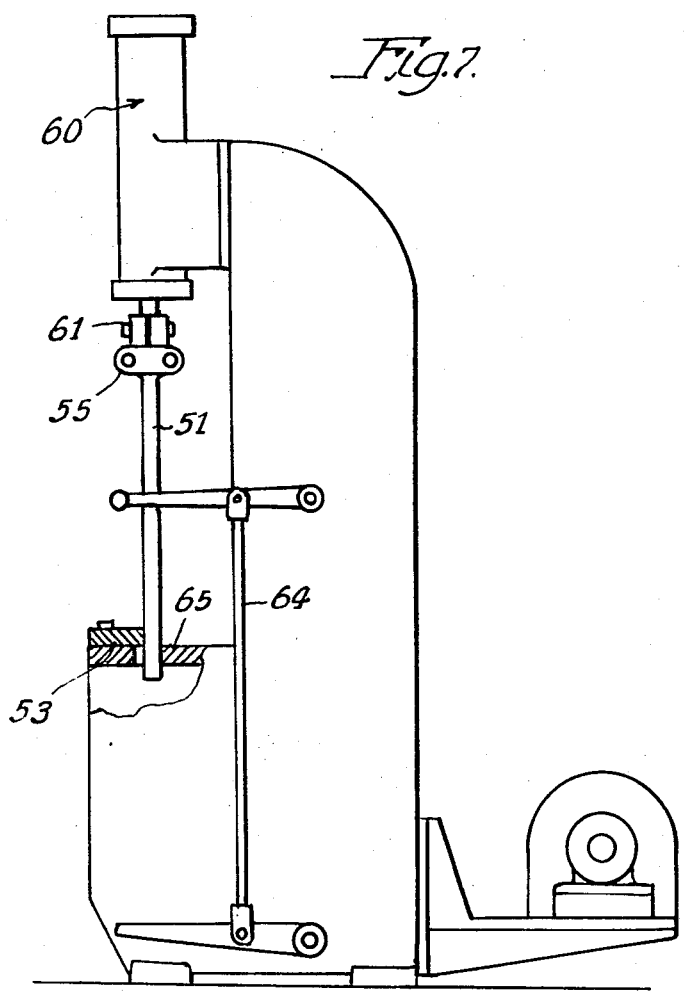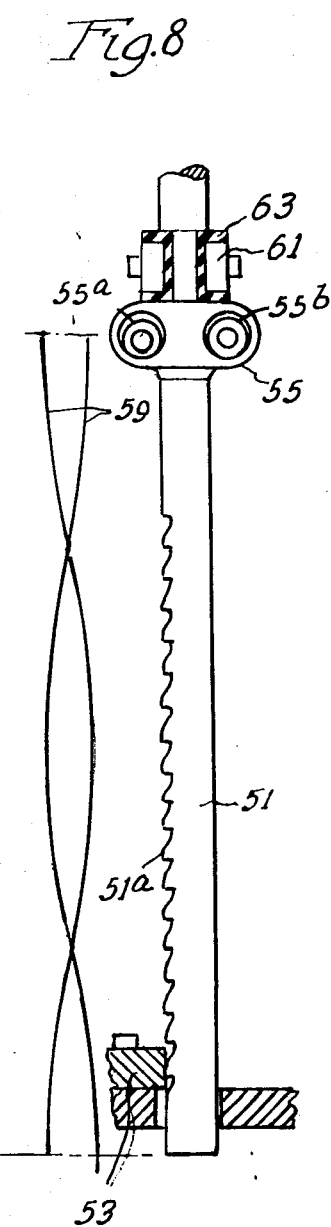

INVENTOR.
Albert G Bodine
BY
Sokolski & Wohlgemuth
Attorneys.

SONIC ENERGY IN MACHINING OPERATIONS

This invention relates to machining such as drilling and the like, and more particularly to the use of sonic energy to facilitate such machining operations.

In machining operations such as the drilling of deep holes in fabricating cylinder blocks and the like, difficulties are often experienced due to the cutting chips becoming jammed between the tool and the walls of the bore. This is especially troublesome in making elongated bores. Similar difficulties are encountered in tapping threads in bores where in many instances the tapping tool becomes completely jammed and is broken off, either completely ruining the workpiece or requiring considerable reworking thereof. Cutting chips on the workpiece also have the adverse effect of causing the tool to drift off from the desired drilling path.

The device and technique of this invention overcomes the aforementioned problem encountered in machining operations by providing sonic energy at the cutting tool during the machining operation which effectively pulverizes the cuttings into finer particles which will not jam the tool and which can be readily removed from the work area.

It is therefore the principal object of this invention to facilitate machining operations by sonically pulverizing the machining cuttings.

It has been found most helpful in analyzing the technique of this invention to analogize the acoustically vibrating circuit utilized to an equivalent electrical circuit. This sort of approach to analysis is well known to those skilled in the art and is described, for example, in Chapter 2 of "Sonics" by Hueter and Bolt, published in 1955 by John Wiley and Sons. In making such an analogy, force F is equated with electrical voltage E, velocity of vibration $u$ is equated with electrical current $i$, mechanical compliance $C_m$ is equated with electrical capacitance $C_e$, mass M is equated with electrical inductance L, mechanical resistance (friction) $R_m$ is equated with electrical resistance R and mechanical impedance $Z_m$ is equated with electrical impedance $Z_e$.

Thus, it can be shown that if a member is elastically vibrated by means of an acoustical sinusoidal force $F_o \sin\omega t$ ($\omega$ being equal to $2\pi$ times the frequency of vibration), that $$Z_m = R_m + j\left(\omega M - \frac{1}{\omega C_m}\right) = \frac{F_0 \sin \omega t}{u} \quad (1)$$

Where $\omega M$ is equal to $1/\omega C_m$, a resonant condition exists, and the effective mechanical impedance $Z_m$ is equal to the mechanical resistance $R_m$, the reactive impedance components $\omega M$ and $1/\omega C_m$ cancelling each other out. Under such a resonant condition, velocity of vibration $u$ is at a maximum, power factor is unity, and energy is more efficiently delivered to a load to which the resonant system may be coupled.

It is important to note the significance of the attainment of high acoustical Q in the resonant system being driven, to increase the efficiency of the vibration thereof and to provide a maximum amount of power. As for an equivalent electrical circuit, the Q of an acoustically vibrating circuit is defined as the sharpness of resonance thereof and is indicative of the ratio of the energy stored in each vibration cycle to the energy used in each such cycle. Q is mathematically equated to the ratio between $\omega M$ and $R_m$. Thus, the effective Q of the vibrating circuit can be maximized to make for highly efficient, high-amplitude vibration by minimizing the effect of friction in the circuit and/or maximizing the effect of mass in such circuit.

In considering the significance of the parameters described in connection with equation (1), it should be kept in mind that the total effective resistance, mass, and compliance in the acoustically vibrating circuit are represented in the equation and that these parameters may be distributed throughout the system rather than being lumped in any one component or portion thereof.

It is also to be noted that orbiting-mass oscillators are utilized in the implementation of the invention that automatically adjust their output frequency and phase to maintain resonance with changes in the characteristics of the load. Thus, in the face of changes in the effective mass and compliance presented by the load with changes in the conditions of the work material as it is sonically excited, the system automatically is maintained in optimum resonant operation by virtue of the "lock-in" characteristic of applicant's unique orbiting-mass oscillators. Furthermore in this connection the orbiting-mass oscillator automatically changes not only its frequency but its phase angle and therefore its power factor with changes in the resistive impedance load, to assure optimum efficiency of operation at all times. The vibrational output from such orbiting-mass oscillators also tends to be constrained by the resonator to be generated along a controlled predetermined coherent path to provide maximum output along a desired axis. These unique characteristics of the orbiting-resonant combination are particularly effective in machining operations where the environmental conditions for the resonant system change as the work progresses.

Briefly described, the technique and apparatus of this invention comprises a machine tool having an elongated stem member fabricated of an elastic material, the working tool being attached to one end of this stem member. Attached to the stem member usually at one end thereof is a sonic generator which includes one or more orbiting-mass oscillators. The orbiting-mass oscillators are driven at a frequency such as to cause resonant elastic vibration of the stem, such vibrational energy being transferred to the working tool, and in some instances thence to the workpiece. The oscillator may provide either a torsional, lateral, or longitudinal vibratory excitation to the stem member, depending upon the particular application requirements. The stem member is appropriately supported in a conventional stand such as a drill press, or the like, in such a manner as to avoid any significant dissipation of vibrational energy into the support members. This end result is achieved by providing vibration isolators where the support is connected to the stem, and in some instances by connecting the support to the stem at points therealong where nodes of the standing wave vibration occur. In carrying out the technique of the invention, vibrational energy may be applied to the tool either in bursts or continuously during the machining operation and sometimes immediately prior thereto.

The invention will now be described in connection with the accompanying drawings of which:

FIG. 1 is an elevational view partially in cross section of a first embodiment of the device of the invention;

FIG. 1a is a sectional view illustrating an alternative tool that may be utilized in conjunction with the embodiment of FIG. 1;

FIG. 2 is a top plan view illustrating the oscillator of the embodiment of FIG. 1;

FIG. 3 is an elevational view in cross section of the oscillator and a portion of the main stem of the embodiment of FIG. 1;

FIG. 4 is an elevational view partially in cross section of a second embodiment of the device of the invention;

FIG. 5 is a cross-sectional view illustrating the oscillator and a portion of the main stem of the embodiment of FIG. 4;

FIG. 6 is a cross-sectional view taken along the plane indicated by 6–6 in FIG. 5;

FIG. 7 is an elevational view of a third embodiment of the device of the invention suitable for utilization in conjunction with a broach bar;

FIG. 8 is an elevational view illustrating the oscillator and broach bar of the embodiment of FIG. 7;

Figure 9:
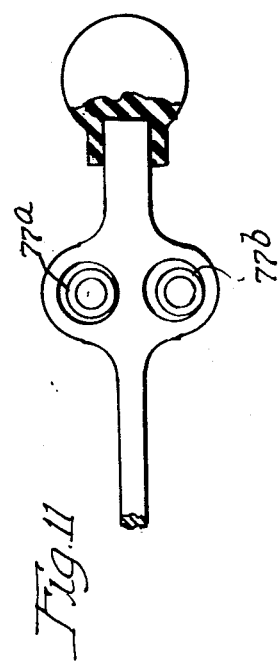
FIG. 9 is a side elevational view in cross section of an embodiment of the device of the invention for use as a deburring tool.

Referring now to FIGS. 1—3, a first embodiment of the device of the invention is illustrated. This embodiment is adapted for use in drilling, reaming or tapping operations and is incorporated into a drilling stand. Main stem 11 of the drill is supported for rotation on ball bearings 12 and 13 in cylindrical sheath 16 which can be vertically adjusted in positioning arm 14 of the drill by means of lever 15. Positioning arm 14 is slidably mounted on drill stand 17 and is used to position the drilling tool 18 in conventional fashion. Main stem 11 is driven by means of gear drive 20 which in turn is rotatably driven by drive belt 21 connected to a motor (not shown). The splines 20a of spline drive 20 engage spline teeth 11a formed in the shaft. The rubber sleeve 23 is utilized to provide vibrational isolation between the stem and the main structure of the drive. Such isolation is also afforded by avoiding contact between stem 11 and the surrounding parts except where absolutely necessary, i.e. at support bearings and gear connections and the like. To further aid in providing vibrational isolation, the equipment may be designed and the vibrational excitation frequency pattern chosen so that nodes of the standing wave vibrational pattern, as indicated by graph lines 27, will appear in the general vicinity of the contact points between the stem and the surrounding members.

Oscillator 30 is attached to the top of stem 11. Oscillator 30 comprises a pair of ring-shaped rotor units 30a and 30b mounted over post members 30c and 30d which are located in the center of raceways 30e and 30f formed in the oscillator housing. Rotors 30a and 30b are rotatably driven in their respective raceways 30e and 30f by means of a pneumatic jet supplied through air line 35. The air jet is fed from line 35 through channel 11b formed in the main stem and thence through channel 30g formed in the oscillator housing, and tangential ports 30h and 30j. The pneumatic stream passes through ports 30h and 30j and impinges on the inner rims respectively of rotors 30a and 30b to cause the rotatable motion thereof.

The rotatable drive of rotors 30a and 30b generates a torsional vibration which is transmitted to stem 11. The frequency of rotation of rotors 30a and 30b is adjusted until a resonant vibration of stem 11 is achieved as indicated by a standing wave pattern in the stem as shown by graph lines 27. This resonant vibrational energy is transmitted to drilling tool 18 and thence to the workpiece and cuttings in the vicinity thereof.

The vibrational energy may be provided to the tool during the drilling operation either in bursts or in a sustained manner, and as already noted, pulverizes the cuttings by virtue of the stress patterns it induces in the structure thereof, so that such cuttings will not impede the machining operation. The pulverized cuttings may be readily removed by an oil stream which is flowed onto the workpiece. The sonic energy will tend to cavitate such cleaning oil bringing it into intimate contact with the workpiece and thus further implementing the cleaning action.

It also may be desirable to provide resonant vibration of tool 18 for a short time immediately preceding the machining operation.

It is to be noted that stem 11 is preferably fabricated of a highly elastic material such as steel, so that it can provide a high Q resonant operation and thus afford optimum sonic energy to the tool. It is also to be noted that stem 11 may be designed for the particular application requirements to provide an optimum acoustical impedance match of the sonic energy to the work load. Thus, tool 18 can be located at a position in the standing wave pattern where it provides either a short stroke with a high oscillating force, or some other impedance condition, so that it efficiently accommodates the particular load conditions at hand. Use of stem 11 as a resonant bar member also readily enables the attainment of a relatively low resonant frequency at which the desired effects can be more readily realized.

Referring to FIG. 1a, a tool 18a which is a tap is illustrated. This tool may be utilized in conjunction with the device of FIG. 1 in lieu of drill 18. As previously noted, where used with a tapping tool the technique of applicant's invention pulverizes the cuttings and prevents the tool from jamming.

Referring now to FIGS. 4—6, a second embodiment of the device of the invention is illustrated. This second embodiment is similar to the first except for the type of oscillator utilized. Thus, the second embodiment has a main stem 11 which is rotatably driven in the same manner as described for the first embodiment by means of drive gear 20 and which is supported for rotation about its longitudinal axis on ball bearings 12 and 13. Stem 11, as for the first embodiment, has a tool member 18 attached to one end thereof. The oscillator 40 differs from that described in the first embodiment, however, in that it provides vibrational energy to stem 11 along the longitudinal axis thereof rather than in a torsional fashion.

Oscillator 40 has a single rotor element 40a which is supported for rotation about post 40b, located in the center of the oscillator housing. Rotor 40a is eccentrically driven around raceway 40c formed in the housing, by means of pneumatic jet which impinges against the inside rim of the rotor and is provided thereto through pneumatic line 35, channel 11b formed in stem 11, and line 43 interconnecting channel 11b and the oscillator housing. When rotor 40a is rotatably driven at a suitable frequency, stem 11 is caused to resonantly elastically vibrate along its longitudinal axis setting up a standing wave pattern therealong as indicated by graph lines 45.

Longitudinal resonant vibration as afforded by the embodiment of FIGS. 4—6 is preferable in combination with rotary drilling in situations where very deep bores are being made, such longitudinal vibration tending to more effectively fracture curled up metal chips across the axis of curl, thereby pulverizing such chips into finer particles in which form it can readily be floated away by cutting oil.

Referring now to FIGS. 7—9, an embodiment of the device of the invention is shown as utilized in a broaching tool such as, for example, might be used in the broaching of aluminum. The particular advantage of the technique and apparatus of the invention in broaching is that the acoustic energy is distributed over the entire resonantly vibrated broaching tool and thus provided to an extended series of cutters, the chips thus being granulated so they can be floated away on the cutting oil with equal efficiency through the entire broaching operation.

As shown in the FIGS., broach bar 51 serves to provide the resonant vibration system and has a plurality of cutters 51a for cutting of workpiece 53. Attached to the top end of broach bar 51 is orbiting-mass oscillator 55 which includes a pair of ring-shaped rotors 55a and 55b which are pneumatically driven about a raceway formed in the oscillator housing by a pneumatic drive (not shown) in the same manner as described for the previous embodiments. Broach bar 51 and attached oscillator 50 are supported on stand 60 by means of attachment clamp 61, the oscillator being vibrationally isolated from the support by means of rubber isolator member 63. The workpiece 53 may be positioned as required by means of positioning mechanism 64 which controls the position of support stand 65. While the broaching operation is being performed, oscillator rotors 55a and 55b are driven at a speed such as to set up longitudinal resonant vibration of broach bar 51, thus setting up standing wave patterns therein as indicated by graph lines 59. The vibrational output of oscillator 55 is along the longitudinal axis of the broach bar and serves to break up the chips generated in the broaching operation into fine particles so that they can readily be removed by cleaning oil.

Figure 10:
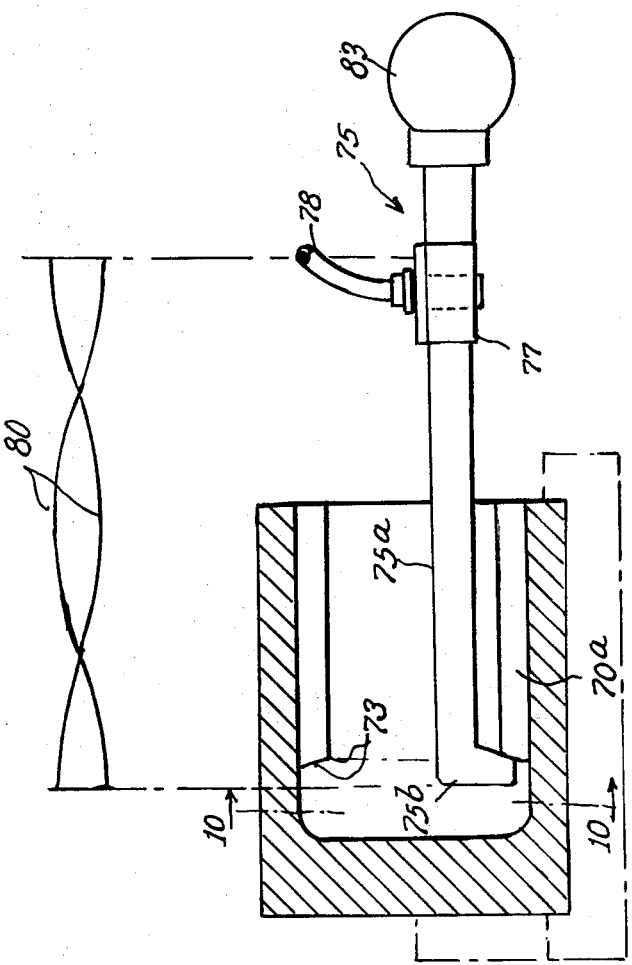
FIG. 10 is a cross-sectional view taken along the plane indicated by 10–10 in FIG. 9.
Figure 11:
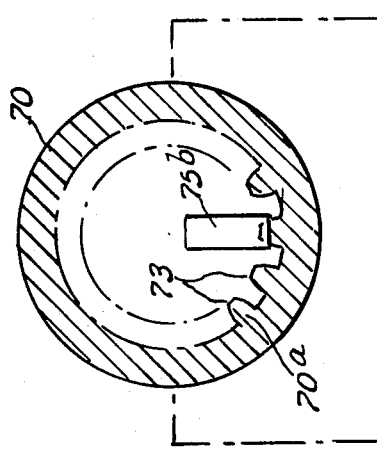
FIG. 11 is a cutaway view illustrating the oscillator of the embodiment of FIG. 9.

Referring now to FIGS. 9—11, a further embodiment of the device of the invention, suitable for use in deburring a workpiece after machining, is illustrated. After the main machining operation has been completed these little burrs and whiskers still hang onto the workpiece, and must be loosened, broken up and removed from the part. A hand abrading tool is generally utilized for this operation. As illustrated in the embodiment of FIGS. 9—11, this operation can be accomplished in a highly efficient manner by utilizing an abrading tool which forms part of a sonic resonant vibration system. As shown in the FIGS., workpiece 70 has a plurality of splined portions 70a formed therein, such splined portions having a certain number of burrs 73 thereon. Such removal is achieved by means of tool 75 which comprises a longitudinal stem 75a having a cutter or impacting head 75b at one end thereof.

Orbiting-mass oscillator 77 includes a pair of rotor members 77a and 77b, which are pneumatically driven around raceways formed in the oscillator housing by a pneumatic drive supplied thereto through pneumatic line 78. Oscillator 77 is of the same type as described in connection with the previous embodiments, and is adjusted to run at a speed such as to cause resonant elastic vibration of stem 75a. Such resonant vibration manifests itself by the establishment of a standing wave vibratory pattern along the stem, as indicated by graph line 80. Cutter 75b is moved along the workpiece, the vibrational energy being transferred thereto and efficiently knocking loose and pulverizing any burrs 73 which may be present on the workpiece. The deburring tool need only be lightly drawn over the surfaces to achieve the desired effect, with the oscillator maintaining resonant operation with changes in the effective impedance of the load presented by the workpiece as the deburring operation is being accomplished. The tool is positioned by an operator by means of handle 83, which is fabricated of an isolating material such as rubber to minimize the transfer of vibrational energy to the operator's hand.

The apparatus and technique of this invention thus provides highly efficient means for removing cuttings and other extraneous material incidental to machining operations. By virtue of the resonant sonic energy of the technique of this invention such material is pulverized to finer particles, in which state it can readily be floated away from the workpiece by oil or the like.

I claim:

1. A method for facilitating the machining of a workpiece with a machine tool having an elongated main stem portion and a cutting tool attached to one end of said stem portion and being driven to perform a machining operation, comprising the steps of:

attaching orbiting-mass oscillator means to said stem portion;

driving said oscillator means at a frequency such as to cause resonant elastic standing wave vibration of said stem portion;

said oscillator means being attached to the stem portion at a region of a velocity antinode of the standing wave vibration pattern;

supporting said stem portion for vibrational isolation; and coupling said stem portion to said tool at a position in the standing wave pattern to provide an acoustical impedance match of the sonic energy to the workpiece, thereby causing the vibrational energy to pass from the tool to the workpiece where it pulverizes cuttings made by said tool.

2. The method of claim 1 in which the resonant energy is applied from said oscillator means to said stem portion so as to cause torsional vibration of said stem.

3. The method of claim 1 in which the resonant energy is applied from said oscillator to said stem portion along the longitudinal axis thereof.

4. The method of claim 1 wherein said tool is a broach bar having a plurality of cutters formed therein, said broach bar forming said main stem portion.

5. The method of claim 1 wherein the sonic energy is applied to said main stem portion in bursts during the machining operation.

6. The method of claim 1 wherein said tool comprises a deburring tool, said deburring tool being manually moved along the workpiece while the main stem portion thereof is resonantly vibrated to remove burrs from the workpiece.

7. In a machine tool having an elongated stem with a cutting member attached to one end of said stem and being driven to perform a machining operation, means for facilitating the removal of cuttings from a workpiece upon which said machine tool is working, comprising:

orbiting-mass oscillator means attached to the end of said stem opposite said one end thereof; means for supporting said stem;

means for driving said oscillator means at a frequency such as to cause resonant standing wave elastic vibration of said stem; means for vibrationally isolating said stem from the support means; said tool being located on said stem at a position in the standing wave pattern to provide an acoustical impedance match of the sonic energy to the workpiece during the machining thereof; and means for placing said tool in contact with said workpiece while said stem is being resonantly vibrated, whereby resonant energy is caused to pulverize the cuttings so that they do not hinder the machining operation.